(12) United States Patent
Wang et al.

(10) Patent No.: US 10,831,508 B2
(45) Date of Patent: Nov. 10, 2020

(54) EMBEDDED SYSTEM APPLICATION INSTALLATION AND EXECUTION METHOD AND APPARATUS

(71) Applicant: Intel Corporation, Santa Clara, CA (US)

(72) Inventors: Ligang Wang, Beijing (CN); Daoming Qiu, Beijing (CN); Yi Zhang, Beijing (CN); Mingqiu Sun, Beaverton, OR (US); Haiwei Zhou, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/307,126

(22) PCT Filed: Jul. 22, 2016

(86) PCT No.: PCT/CN2016/090976
§ 371 (c)(1),
(2) Date: Dec. 4, 2018

(87) PCT Pub. No.: WO2018/014327
PCT Pub. Date: Jan. 25, 2018

(65) Prior Publication Data
US 2019/0265988 A1 Aug. 29, 2019

(51) Int. Cl.
*G06F 9/445* (2018.01)
*G06F 8/61* (2018.01)

(52) U.S. Cl.
CPC ............ *G06F 9/44589* (2013.01); *G06F 8/61* (2013.01); *G06F 9/445* (2013.01)

(58) Field of Classification Search
CPC ... G06F 8/60–71; G06F 9/445; G06F 9/44589
(Continued)

(56) References Cited

U.S. PATENT DOCUMENTS 6,272,677 B1 *  8/2001  Lam .................... G06F 8/65
                                           707/999.202
7,331,063 B2 *  2/2008  Gunyakti ............ G06F 21/10
                                           705/57
(Continued)

FOREIGN PATENT DOCUMENTS

TW         201617955 A      5/2016

OTHER PUBLICATIONS

Agirre, A., et al., Distributed Applications Management Platform Based on Service Component Architecture, Proceedings of 2012 IEEE 17th International Conference on Emerging Technologies & Factory Automation (ETFA 2012), Sep. 17-21, 2012, 4 pages, [ retrieved on Jul. 2, 2020], Retrieved from the Internet.*
(Continued)

*Primary Examiner* — Geoffrey R St Leger

(57) ABSTRACT

Apparatuses, methods and storage medium associated with installing and executing an application program on an embedded system are described herein. In embodiments, an embedded system may include an application management program and an application execution program to install an application program onto the embedded system. The application management program is to verify metadata associated with the application program, in response to a first request to install the application program on the embedded system; and the application execution program is to verify the application program, in response to a second request, subsequent to the first request, to verify the application program. Other aspects and embodiments may be described and/or claimed.

22 Claims, 5 Drawing Sheets

(58) Field of Classification Search
USPC .................................................. 717/168–178
See application file for complete search history.

(56) References Cited

U.S. PATENT DOCUMENTS

| | | | | |
|---|---|---|---|---|
| 7,523,452 | B1* | 4/2009 | Kamity | G06F 8/65 |
| | | | | 717/178 |
| 7,900,056 | B1* | 3/2011 | Murphy, Jr. | G06F 8/65 |
| | | | | 713/189 |
| 8,418,230 | B1* | 4/2013 | Cornelius | G06F 21/6218 |
| | | | | 726/3 |
| 8,973,090 | B1 | 3/2015 | Banerjee | |
| 9,430,648 | B2* | 8/2016 | Jang | G06F 8/654 |
| 9,652,608 | B2* | 5/2017 | Li | G06F 21/51 |
| 2006/0070063 | A1* | 3/2006 | Takashige | G06F 8/60 |
| | | | | 717/174 |
| 2007/0028224 | A1 | 2/2007 | Huang | |
| 2007/0234343 | A1* | 10/2007 | Gouge | G06F 21/51 |
| | | | | 717/174 |
| 2013/0007726 | A1* | 1/2013 | Poddar | G06F 8/63 |
| | | | | 717/175 |
| 2013/0144934 | A1* | 6/2013 | Swett | G06F 8/61 |
| | | | | 709/203 |
| 2014/0090019 | A1* | 3/2014 | Ohmata | G06F 21/6218 |
| | | | | 726/3 |
| 2014/0153040 | A1 | 6/2014 | Yun et al. | |
| 2015/0134970 | A1* | 5/2015 | Jang | G06F 8/654 |
| | | | | 713/176 |
| 2016/0092672 | A1* | 3/2016 | Li | G06F 21/51 |
| | | | | 726/22 |
| 2016/0299749 | A1* | 10/2016 | Sharma | G06F 8/61 |

OTHER PUBLICATIONS

Adelsbach, A., et al., Secure software delivery and installation in embedded systems, Embedded Security in Cars, 2006, 54 pages, [retrieved on Jul. 2, 2020], Retrieved from the Internet.*

International Search Report and Written Opinion dated Apr. 25, 2017 for International Patent Application No. PCT/CN2016/090976, 11 pages.

* cited by examiner

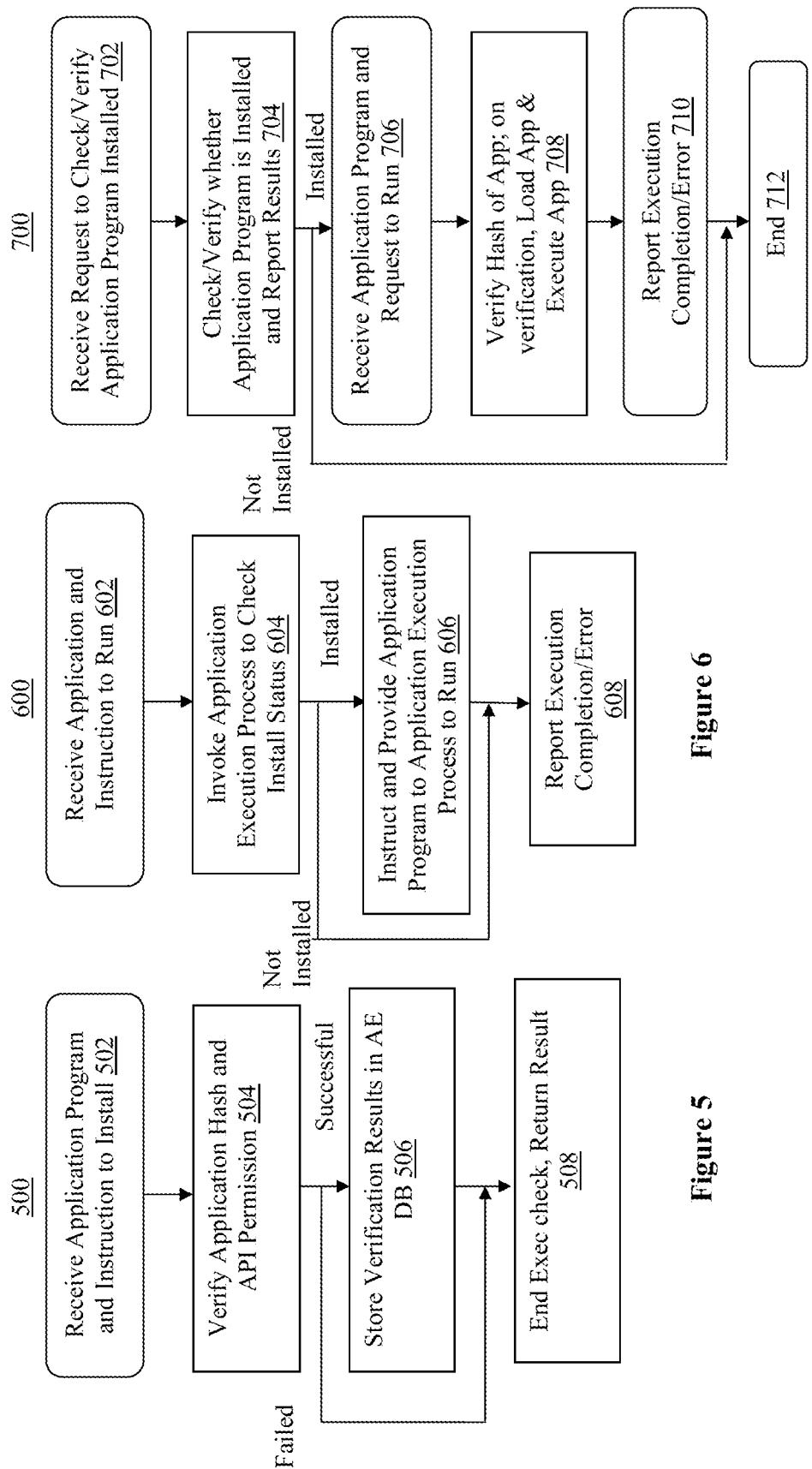

EMBEDDED SYSTEM APPLICATION INSTALLATION AND EXECUTION METHOD AND APPARATUS

CROSS REFERENCE TO RELATED APPLICATIONS

The present application is a national phase entry under 35 U.S.C. § 371 of International Application No. PCT/CN2016/090976, filed Jul. 22, 2016, entitled "EMBEDDED SYSTEM APPLICATION INSTALLATION AND EXECUTION METHOD AND APPARATUS", which designated, among the various States, the United States of America. The Specifications of the PCT/CN2016/090976 Application is hereby incorporated by reference.

TECHNICAL FIELD

The present disclosure relates to the field of embedded systems. More particularly, the present disclosure relates to methods, apparatus and media associated with installation and execution of application programs on embedded systems.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

On general-purpose computers, dynamic installation of application is a common feature. Typically, general-purpose computers have abundance of resource, thus it is almost trivial to implement dynamic installation of application.

BRIEF DESCRIPTION OF THE DRAWINGS

Embodiments for installing and executing applications on embedded system will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 3 illustrates an example process for installing an application program on an embedded system, for a system outside the embedded system, according to various embodiments.

FIGS. 4-5 illustrate an example process for installing an application program on an embedded system, for the embedded system, according to various embodiments.

FIG. 6 illustrates an example process for executing an application program on an embedded system, for a system outside the embedded system, according to various embodiments.

FIG. 7 illustrates an example process for executing an application program on an embedded system, for the embedded system, according to various embodiments.

DETAILED DESCRIPTION

Figure 1:
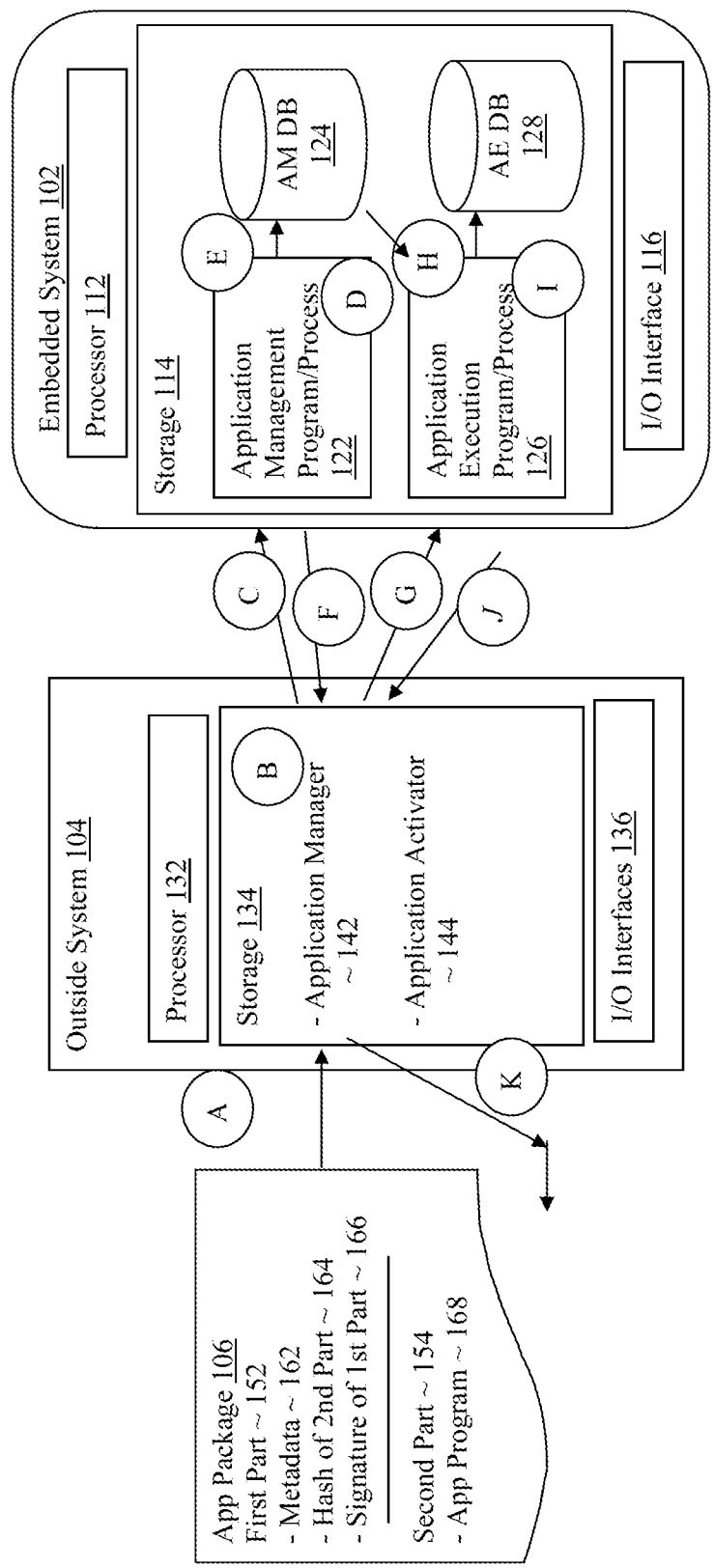
FIGS. 1-2 illustrate an example embedded system, and an example system outside the embedded system, incorporated with the application installation and execution technology of the present disclosure, according to various embodiments.

Most embedded operating systems have no ability to install new applications after manufacturing. This can cause serious problem for Internet-of-Things (IOT) deployment. IOT devices are connected and interacting with their surrounding environments. These devices often need to be updated to handle new usage models, new communication protocol or new security threats. However, on embedded systems, it is a significant challenge to design a secure application install facility with the resource constrained environment, which could be as little as 100 KBs of RAM for the whole embedded system. As a result, application installed on embedded system is often implemented via static configuration changes, and require software rebuild at manufacturing. Unfortunately, such requirement does not serve IOT usage models well. Meeting all the requirements for security and resource efficiency is a big challenge, especially for IOT devices with small memory.

Apparatuses, methods and storage medium associated with installing and executing an application on an embedded system that may address the problem, are disclosed herein. In embodiments, an embedded system may comprise a processor and storage coupled with the processor; and an application management program and an application execution program, disposed in the storage, to be operated by the processor to install an application program onto the embedded system. To install the application program on the embedded system, the application management program may verify metadata associated with the application program, in response to a first request to install the application program on the embedded system. Further, the application execution program may verify the application program, in response to a second request, subsequent to the first request, to verify the application program.

In embodiments, an apparatus for installing and executing an application program on an embedded system may comprise a processor and a storage coupled with the processor; and an application manager disposed in the storage, to be operated by the processor to cause an application program to be installed on an embedded system. To cause the application program to be installed on the embedded system, the application manager may receive an application package having a first part that includes metadata of the application program, and a second part that includes the application program; split the application package to separate the first and the second part; and transmit a first request and the metadata, together or separately, to an application management process of the embedded system to request the application management process to process the metadata to install the application program onto the embedded system. Additionally, the application manager, on receipt of a report on the successful processing of the metadata, may transmit a second request and the application program, together or separate, to an application execution process of the embedded system to process the application program to complete installation of the application program onto the embedded system.

Further, in embodiments, the apparatus may comprise an application activator disposed in the storage, to be operated by the processor to cause an application program installed on an embedded system to be executed on the embedded system. To cause the application program to be executed on the embedded system, the application activator may transmit a request to an application management process of the embedded system to check on whether the application program is installed on the embedded system. On receipt of a report that indicates the application program is installed on the embedded system, the application activator may transmit a request and the application program, together or separately, to an application execution process of the embedded system to execute the application program on the embedded system.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs having machine instructions (generated from an assembler or compiled from a high level language compiler), a combinational logic circuit, and/or other suitable components that provide the described functionality.

As used herein, the phrase "an application program is installed on an embedded system" (and its variants) means the application program has successful gone through an installation process to have the application program verified and registered on the embedded system, rendering the application program to be eligible for execution on the embedded system. The executable binaries of the application program themselves may or may not be stored on the embedded system. Execution of the application program on the embedded system may require the executable binaries of the application program to be provided to the embedded system each time the application program is to be executed on the embedded system.

Figure 2:
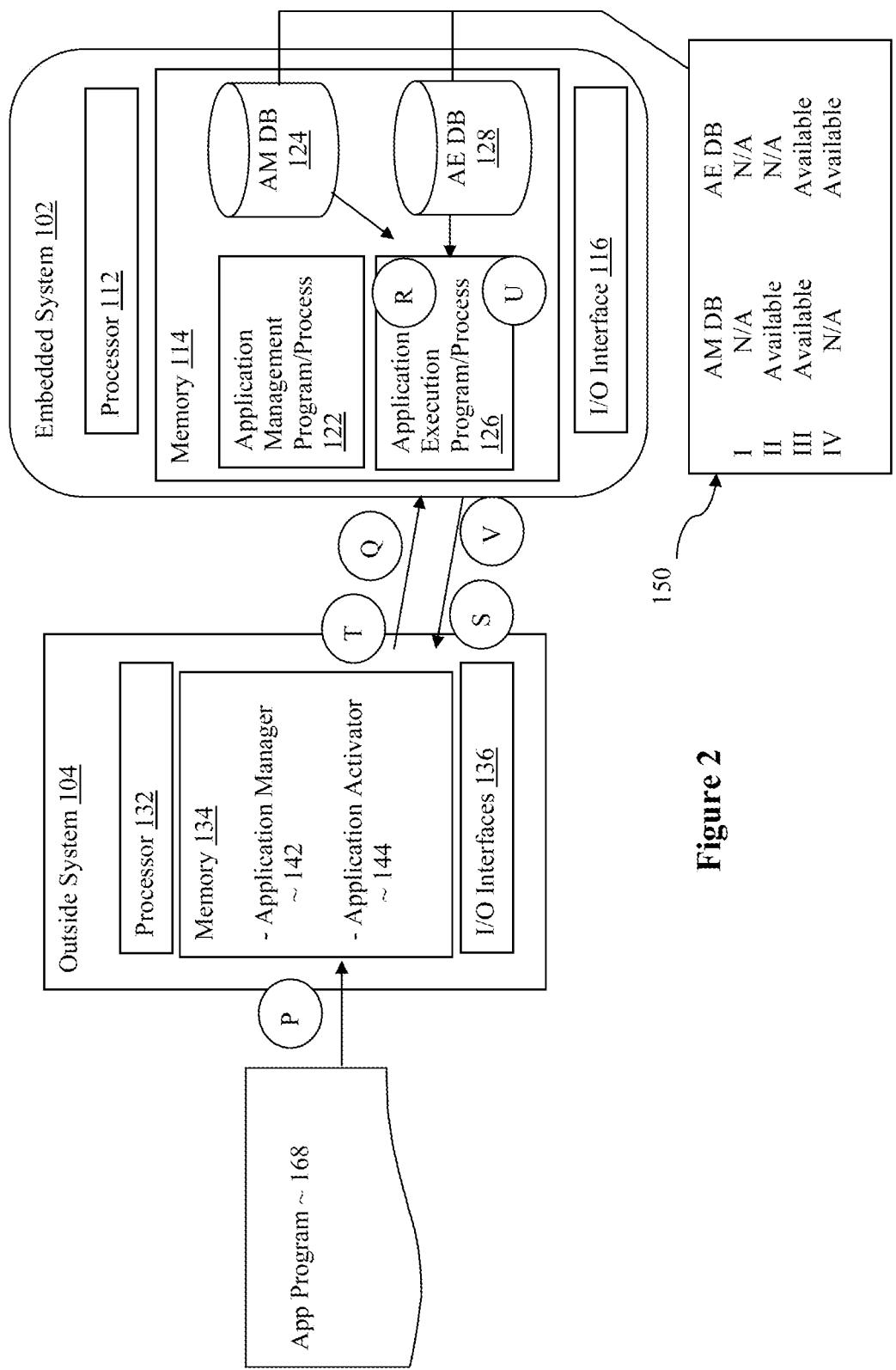

Referring now to FIGS. 1-2, wherein an example embedded system, and an example system outside the embedded system, incorporated with the application installation and execution technology of the present disclosure, according to various embodiments, are illustrated. As shown, embedded system 102 may include processor 112, storage 114 and input/output (I/O) interface 116, coupled with each other. Disposed within storage 114 are application management (AM) program 122, AM database (DB) 124, application execution (AE) program 126, and AE DB 128. Example of embedded system 102 may include, but is not limited to, an IoT device.

Processor 112 may be any one of a number of processors suitable for embedded systems known in the art. Examples of suitable processors may include, but are not limited to, Intel® Xeon® processors, Intel® Core™ Pentium® Celeron® processors, Intel® Atom™ processors, or Intel® Quark™ processors. Storage 114 may be any non-volatile memory or persistent storage known in the art, such as, but are not limited to, Flash Memory. The size of storage 114 may be limited, e.g., as little as 100 KB. I/O interface 116 may be any I/O interfaces suitable for embedded systems, and for communicating with outside system 104 (depending on how far outside system 104 is), such as, but are not limited to, universal serial bus (USB), Near Field Communication (NFC), ZigBee, Bluetooth®, WiFi, and so forth.

An execution instance of a program may be referred to as a process. Thus in the description to follow, AM program 122 and AE program 126 will be referred to as AM process 122 and AE process 126 respectively, when AM program 122 and AE program 126 are referred to in the context of their execution. Further, each of AM process 122 and AE process 126 may execute its own memory area. Embedded system 102 may not have user level share memory support, nor user level library sharing. Accordingly, AM DB 124 and AE DB 128 are respectively associated with AM process 122 and AE process 126, with each have corresponding write access. Additionally, AE process 126 may have read access to AM DB 124.

AM program 122 and AE program 126 may be respectively configured to primarily manage application programs (including installation) and execution of application programs on embedded system 102. However, according to the teachings of the present disclosure, AM program 122 and AE program 126 may be configured to cooperate to install an application program, e.g., 168, onto embedded system 102, utilizing AM DB 124 and AE DB 128, with AM process 122 offloading some of the installation work to AE process 126, thereby reducing or eliminating duplication of code between AM program 122 and AE program 126. From the description to follow, those skilled in the art will also appreciate, the manner of offloading does not require inter-process communication (IPC) between AM process 122 and AE process 126, eliminating the need for IPC support. As a result, an application program may be securely installed onto embedded system 102, post manufacturing, without requiring the software of embedded system 102 to be rebuilt, even embedded system 102 has limited storage, e.g., as little as 100 KB as mentioned earlier, does not support shared user memory or have shared library.

These and other aspects will be further described in detail, after description of application package 106 and system 104 outside of embedded system 102.

As illustrated, application package 106 may include two parts 152 and 154. In embodiments, second part 154 may include the executable binaries of application program 168. First part 152 may include metadata 162 describing application program 168, e.g., its application programming interface (API) permissions, and a hash of the second part 164, i.e., a hash of the executable binaries of application program 168. Further, first part 152 may include a signature 166 of the first part.

Outside system 104, similar to embedded system 102, may include processor 132, storage 134 and I/O interfaces 136, coupled with each other. Disposed within storage 134 are application manager 142 and application activator 144. In embodiments, outside system 104 may be remotely disposed from embedded system 102. In other embodiments, outside system 104 may be hosting embedded system 102.

Processor 132 may be any one of a number of processors suitable for remote or host to embedded system known in the art. Examples of suitable processors may include, but are not limited to, any one of a number of Intel® X86 architecture processors. Storage 134 may be any non-volatile memory or persistent storage known in the art, such as, but are not limited to, Flash Memory. I/O interface 136 may be any I/O interfaces suitable for remote or host to embedded systems, and for communicating with embedded system 102 (depending on how far embedded system 102 is), such as, but are not limited to, universal serial bus (USB), Near Field Communication (NFC), ZigBee, Bluetooth®, WiFi, and so forth.

Referring in particular to FIG. 1, the process of installation may begin with application manager 142 receiving application package 106, and a request to install application program 168 onto embedded system 102, operation A. In response, application manager 142 may split application package 106 into two parts, first part 152 and second part 154, operation B.

Thereafter, application manager 142 may request AM process 122 to install application program 168 onto embedded system 102, operation C. Application manager 142, as part of the request, may provide first part 152 of application package 106 to AM process 122, without providing the second part. The request and first part 152 may be provided to AM process 122 together or separate.

On receipt, AM process 122 may first verify the signature 166 of the first part, and on successful verification, process metadata 162, and store metadata 162, including hash 164 of application program 168 and its API permissions, into AM DB 124, operation E. Hash 164 and the API permissions stored into AM DB 124 will be subsequently used by AE process 126 when it is called upon to perform its cooperative part of the installation process. Thus, the stored copy of hash 164 and the API permissions may be referred to as a reference hash 164 and reference API permissions. On successful completion of its operations, AM process 122 may report the installation results to application manager 142, operation F. AM process 122 may also report failure of installation to application manager 142, if its operations are not successfully complete, operation F.

On receipt of a report from AM process 122, that indicates successful processing of the metadata to install application program 168, application manager 142 may request AE process 126 to perform its part to complete installation of application program 168, operation G. Application manager 142, as further provide together with or separate from the request, second part 154 of application package 106 to AE process 126, without re-providing the metadata.

On receipt, AE process 126 may first verify application program 168, using the reference hash stored in AM DB 124 by the AM process 122, operation H. Further, AE process 126 may verify the API permissions of application program 168, using the reference API permissions stored in AM DB 124 by AM process 122, operation H. On successful completion of its operations, AE process 126 may store a record of successful installation into AE DB 128, operation I. Further, AE process 126 may report the installation results to application manager 142, operation J. AE process 126 may also report failure of installation to application manager 142, if its operations are not successfully complete, operation J. In embodiments, on reporting the completion of its operation, whether success or failed, AE process 126 does not retain or otherwise discard application program 168 (to avoid consuming storage 114).

As those skilled in the art will appreciate that AE process 126, to manage execution of any application program, includes code for verifying API permissions of an application program, e.g., in its linker. Thus, by having AE process 126 cooperate and offload AM process 122 the task of verifying the API permissions (other than processing and storing), it is not necessary to provide the code for performing API permission verification to AM program/process 122, thereby reducing its memory requirement.

On receipt of the installation report from AE process 126, application manager 142, in turn, may report the installation result, back to the original sender of the request to install application program 168 onto embedded system 102.

Note that application activator 144, while shown in FIGS. 1 and 2, is not involved in the installation of application program 168. Application activator 144 is involved in causing application program 168 to be executed, to be described next.

Referring now in particular to FIG. 2, as illustrated by table 150, with respect to whether application program 168 have been installed on embedded system 102, the states of AM DB 124 and AE DB 128 may be in one of four states. State I shows both AM DB 124 and AE DB 128 as not having information about application program 168, reflecting application program 168 not having been installed. State II shows AM DB 124 as having information about application program 168, and AE DB 128 does not having information about application program 168, reflecting the first phase of the installation of application program 168 was successful, and the second phase of the installation of application program 168 has not been performed or failed.

State III shows both AM DB 124 and AE DB 128 as having information about application program 168, reflecting both phases of the installation of application program 168 were successful. Application program 168 has been successfully installed. State IV shows AM DB 124 as not having information about application program 168, and AE DB 128 as having information about application program 168, reflecting an error or exception may have occurred, or application program 168 has been uninstalled.

With this information, application activator 144 may cause application program 168 to be executed on embedded system 102. As illustrated, the execution may begin with application activator 144 receiving a request to cause application program 168 to be executed on embedded system 102, operation P. The request may come from any source, and the request may include application program 168 or a location where application program 168 may be obtained.

On receipt, application activator 144 may request AE process 126 to check to confirm whether application program 168 is installed (i.e. having gone through an installation process, and effectively registered and eligible to be executed on embedded system 102), operation T.

In response, AE process 126 may check the two databases, AM DB 124 and AE DB 128, to confirm that together they are showing state III as earlier described. On confirmation, AE process 126 may inform application activator 144 accordingly, operation S. Similarly, if AM DB 124 and AE DB 128 are in any one of the other three states, AE process 126 may likewise inform application activator 144, operation S.

On receipt of confirmation that application program 168 is installed on embedded system 102, application activator 144 may request AE process 126 to process to execute application program 168, operation Q. As part of the request, application activator 144 may provide application program 168 to AR process 126. Recall during the installation process, AE process 126 does not retain a copy application program 168.

On receipt of application program 168, AE process 126 may verify application program 168, using the reference hash stored in AM DB 124, operation U. On verification, AE process 126 may load application program 168 and transfer execution control application program 168, causing it to execute, operation U.

On completion of execution, AE process 126 may report back to application activator 144 on whether the execution was completed without error, operation V.

Figures 3, 4:
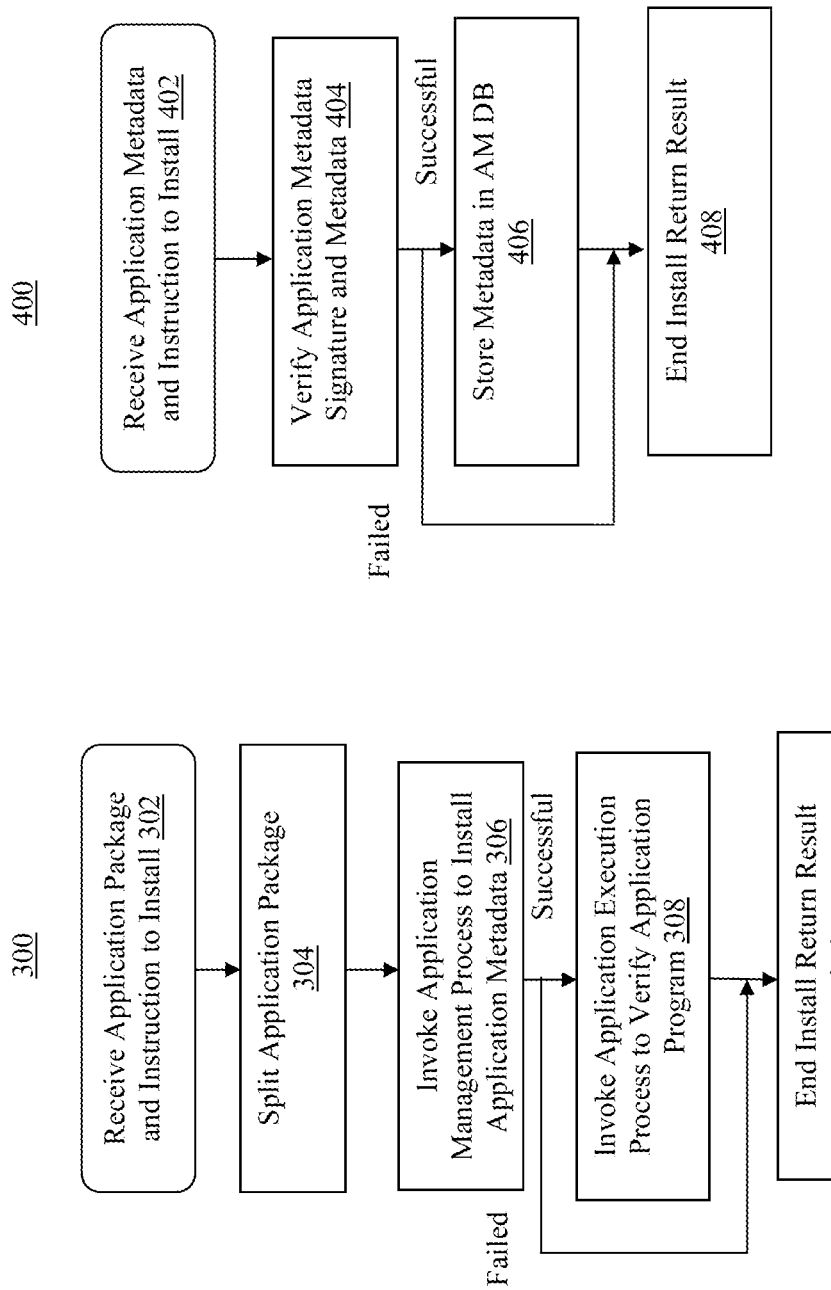

Referring now to FIGS. 3-7, wherein example processes for installing and executing an application program on an embedded system, for a system outside the embedded system, and the embedded system itself, according to various embodiments, are illustrated. More specifically, FIG. 3 illustrates an example process for installing an application program on an embedded system, for a system outside the embedded system, according to various embodiments. As shown, process 300 for installing an application program on an embedded system, for a system outside the embedded system, may comprise operations performed at blocks 302-310. The operations may be performed e.g., by earlier described application manager 142. Accordingly, FIG. 3 also depicts the algorithmic structure of a module like application manager 142.

As shown, process 300 may begin at block 302. At block 302, an application package and an instruction to install an application program of the application package may be received. In embodiments, as described earlier, the application package may include two parts, a first part with the metadata of the application program and a signature of the metadata, and a second part with the application program. The metadata included in the first part may include a hash of the application program and application programming interface permissions of the application program.

Next, at block 304, the application package may be split into two parts, the first part and the second part. At block 306, a request and the metadata may be transmitted, together or separately, to an application management process of the embedded system to install the application program, resulting the metadata being processed and stored into an AM DB of the embedded system, if installation (processing of the metadata) is successful.

If installation (processing of the metadata) is successful, process 300 may continue at block 308, otherwise, skip forward to block 310. At block 308, another request, subsequent to the earlier described request, together with or followed by the application program, may be transmitted to an application execution process of the embedded system to process the application program to complete installation of the application program.

Next, at block 310, on receipt of a report of a failure of the initial processing of the metadata of the application program, or report of a failure or success of the subsequent processing of the application program, a report on the result of the installation may be transmitted to the original party who requested the installation.

FIGS. 4-5 illustrate an example process for installing an application program on an embedded system, for the embedded system, according to various embodiments. More specifically, FIG. 4 illustrates an example first phase of the process for installing an application program on an embedded system, for the embedded system, according to various embodiments. Process 400 for a first phase of installing an application program on an embedded system may include operations to be performed at blocks 402-408. The operations may be performed e.g., by earlier described AM Process 122. Accordingly, FIG. 4 also depicts the algorithmic structure of a module like AM Program/Process 122. As shown, process 400 may begin at block 402. At block 402, a request to install the application program and the metadata of an application program may be received, together or separately. As described earlier, in embodiments, the metadata may include a signature of the metadata, a hash and API permissions of the application program. Next, at block 404, the metadata may first be verified, e.g., using the signature of the metadata. Further, the metadata including the API permissions may be processed.

From block 404, process 400 may proceed to block 406 if processing of the metadata is successful; else, if the processing is unsuccessful, process 400 may proceed to block 408 instead. At block 406, the metadata may be stored, e.g., in earlier described AM DB 124. At block 408, on failure or successful processing and storage of the metadata, a report on the result of the installation may be provided to the entity requested the first phase of installing the application program.

FIG. 5 illustrates an example second phase of the process for installing an application program on an embedded system, for the embedded system, according to various embodiments. Process 500 for a second phase of installing an application program on an embedded system may include operations to be performed at blocks 502-508. The operations may be performed e.g., by earlier described AE Process 126. Accordingly, FIG. 5 also depicts the installation aspect of the algorithmic structure of a module like AE Program/Process 126.

As shown, process 500 may begin at block 502. At block 502, a request to install an application program, and the application program, may be received, together or separately. Next, at block 504, the application program including its API permissions may be verified as earlier described.

From block 504, process 500 may proceed to block 506 if processing of the application program is successful; else, if the processing is unsuccessful, process 500 may proceed to block 508 instead. At block 506, a record of successfully installing (processing) the application program may be stored, e.g., in earlier described AE DB 128. At block 508, on failure or successful processing the application program and storing a successful record if processing is successful, a report on the result of the installation may be provided to the entity requested the second phase of installing the application program.

FIG. 6 illustrates an example process for executing an application program on an embedded system, for a system outside the embedded system, according to various embodiments. Process 600 for executing an application program on an embedded system for the embedded system may include operations to be performed at blocks 602-608. The operations may be performed e.g., by earlier described application activator 144. Accordingly, FIG. 6 also depicts the algorithmic structure of a module like application activator 144.

As shown, process 600 may start at block 602. At block 602, a request to execute an application program on an embedded system may be received by a system outside the embedded system. Next, at block 604, a request to check/verify the application program has been installed on the embedded system may be transmitted to the embedded system, e.g., to an AE Process 126 of the embedded system.

On receipt of a confirmation that the application program has been installed on the embedded system, process 600 may proceed to block 606, otherwise, if not installed, process 600 may proceed to block 608 instead. At block 606, the application program may be obtained, and then a request to run the application program, and the application program, may be transmitted together or separately to the embedded system, e.g., to an AE Process 126 of the embedded system.

At block 610, on receipt of a report of not installed, or on receipt of a report of normal or abnormal completion of execution of the application program, a report may be sent to the entity requested execution of the application program, reporting whether the application was executed, and if so, whether the execution ended normally or abnormally.

FIG. 7 illustrates an example process for executing an application program on an embedded system, for the embedded system, according to various embodiments. Process 700 for executing an application program on an embedded system for the embedded system may include operations to be performed at blocks 702-710. The operations may be performed e.g., by earlier described AE Process 128. Accordingly, FIG. 7 also depicts the execution aspects of the algorithmic structure of a module like AE Program/Process 128.

As shown, process 700 may start at block 702. At block 702, a request to check/verify the application program has been installed on the embedded system may be received by the embedded system. Next, at block 704, a check on whether the application program has been installed on the embedded system may be performed, e.g., against AM DB 124 of the embedded system. On checking, the result of the checking, whether installed or not installed may be reported.

On confirmation that the application program has been installed on the embedded system, process 700 may proceed to block 706, otherwise, if not installed, process 700 may proceed to block 712 instead. At block 706, a request to run the application program, together with the application or separately, may be received by the embedded system.

At block 708, on receipt of the request and the application program, the application program may be verified, e.g., against the reference hash stored in AM DB 124, and on verification, the application program may be loaded, and caused to be executed. At block 710, completion of execution, normal or abnormal completion, may be reported.

At block 712, on reporting the application has not been installed, or on reporting completion of execution, normal or abnormal completion, process 700 may end.

Figure 8:
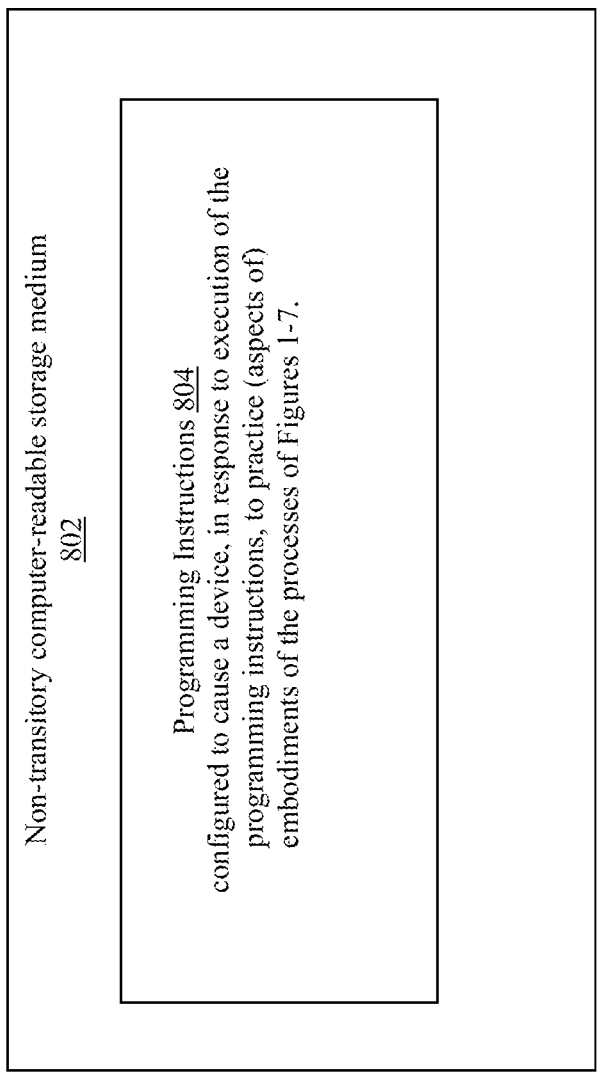
FIG. 8 illustrates a storage medium having instructions for practicing methods described with references to FIGS. 1-7, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable an embedded system, e.g., embedded system 102, or a system outside the embedded system e.g., system 104, to perform various operations associated with AM Program/Process 122, AE Program/Process 126, application manager 142 and/or application activator 144. In alternate embodiments, programming instructions 804 may be disposed on multiple computer-readable non-transitory storage media 802 instead. In alternate embodiments, programming instructions 804 may be disposed on computer-readable transitory storage media 802, such as, signals.

Any combination of one or more computer usable or computer readable media may be utilized. The computer-usable or computer-readable medium/media may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium/media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may be an embedded system, comprising: a processor and a storage coupled with the processor; and an application management program and an application execution program, disposed in the storage, to be operated by the processor to install an application program onto the embedded system, wherein to install the application program on the embedded system: the application management program may verify metadata associated with the application program, in response to a first request to install the application program on the embedded system; and the application execution program may verify the application program, in response to a second request, subsequent to the first request, to verify the application program.

Example 2 may be example 1, wherein the application management program and the application execution program may be operated by the processor as separate processes.

Example 3 may be example 1, wherein the application management program may receive the first request to install the application program onto the embedded system, and the metadata of the application program from an application manager located outside the embedded system; and the application management program may further report whether the verification is successful or not to the application manager.

Example 4 may be example 3, wherein the metadata of the application program may include a signature of the metadata; and wherein verification of the metadata may comprise verification of the metadata matches the signature.

Example 5 may be example 3, further comprising an application management database disposed in the storage, which the application management program has write access, and the application execution program has only read access; wherein the application management program may further on verification, store the metadata into the application management database.

Example 6 may be example 5, wherein the metadata may include a hash and application programming interface permission(s) of the application program; wherein storage of the metadata into the application management database may include storage of the hash and the application programming interface permission(s) of the application program into the application management database.

Example 7 may be example 1, wherein the application execution program may receive the second request to install the application program onto the embedded system, and the application program from an application manager located outside the embedded system; and the application execution program may further report whether the verification is successful or not to the application manager.

Example 8 may be example 7, wherein verification of the application may comprise verification of a hash of the application program matches a reference hash of the application program stored on the embedded system by the application management program, and verification of application programming interface permissions of the application program matches reference application programming interface permissions of the application program stored on the embedded system by the application management program.

Example 9 may be example 7, further comprising an application execution database disposed in the storage, which the application execution program has write access; wherein the application execution program may further on verification, store a record of the successful verification into the application execution database, but not the application program.

Example 10 may be example 1, wherein the application execution program may further receive a request to check whether the application program is installed on the embedded system, from an application activator outside the embedded system, and in response, report whether the application program is installed or not to the application activator.

Example 11 may be example 10, wherein the application execution program may further receive a request to run the application program, along with the application program, from the application activator outside the embedded system, and in response, verify the application program, and on verification, load the application program, and cause the application program to be executed; wherein on execution of the application program, the application execution program may further report whether execution of the application program was completed without error, without retaining the application program on the embedded system.

Example 12 may be any one of examples 1-11, wherein the embedded system is an Internet-of-Thing.

Example 13 may be an apparatus for installing and executing an application program on an embedded system, comprising: a processor and a storage coupled with the processor; and an application manager disposed in the storage, to be operated by the processor to cause an application program to be installed on an embedded system, wherein to cause the application program to be installed on the embedded system, the application manager may: receive an application package having a first part that may include metadata of the application program, and a second part that may include the application program; split the application package to separate the first and the second part; and transmit a request along with the metadata to an application management process of the embedded system to request the application management process to install the application program onto the embedded system.

Example 14 may be example 13, wherein the application manager may further receive a report from the application management process on whether the application program is successfully installed onto the embedded system or not.

Example 15 may be example 14, wherein on receive a report from the application management process that indicates the application program is successfully installed onto the embedded system, the application manager may further transmit a request along with the application program to an application execution process of the embedded system to install the application program onto the embedded system.

Example 16 may be example 15, wherein the application manager may further receive a report from the application execution process on whether the application program is successfully installed onto the embedded system or not.

Example 17 may be example 13, further comprising an application activator disposed in the storage, to be operated by the processor to cause an application program installed on an embedded system to be executed on the embedded system, wherein to cause the application program to be executed on the embedded system, the application activator may transmit a request to an application management process of the embedded system to check on whether the application program is installed on the embedded system.

Example 18 may be example 17, wherein on receipt of a report that indicates the application program is installed on the embedded system, the application activator may transmit a request along with the application program to an application execution process of the embedded system to execute the application program on the embedded system.

Example 19 may be example 18, wherein the application activator may further receive a report from the application execution process on whether the application program is executed onto the embedded system to completion without error.

Example 20 may be any one of examples 13-18, wherein the apparatus may further comprise the embedded system.

Example 21 may be a method for installing and executing an application on an embedded system, comprising: verifying, by an application management process of the embedded system, metadata associated with the application program, in response to a first request to install the application program on the embedded system; and verifying, by an application execution process, the application program, in response to a second request, subsequent to the first request, to verify the application program.

Example 22 may be example 21, wherein verifying by the application management process and verifying by the application execution process may comprise executing the application management program and the application execution program as separate processes.

Example 23 may be example 21, wherein verifying by the application management process may comprise receiving, by the application management process, the first request to install the application program onto the embedded system, and the metadata of the application program from an application manager located outside the embedded system; and reporting, by the application management process, whether the verification is successful or not to the application manager.

Example 24 may be example 23, wherein the metadata of the application program may include a signature of the metadata; and wherein verification of the metadata may comprise verification of the metadata matches the signature.

Example 25 may be example 23, wherein verifying by the application management process may comprise on verification, storing, by the application management process, the metadata into an application management database, which the application management process has write access, and the application execution process has only read access.

Example 26 may be example 25, wherein the metadata may include a hash and application programming interface permission(s) of the application program; wherein storing the metadata into the application management database may include storing the hash and the application programming interface permission(s) of the application program into the application management database.

Example 27 may be example 21, wherein verifying by the application execution process may comprise receiving, by the application execution process, the second request to install the application program onto the embedded system, and the application program from an application manager located outside the embedded system; and reporting, by the application execution process, whether the verification is successful or not to the application manager.

Example 28 may be example 27, wherein verifying by the application execution process may comprise verifying a hash of the application program matches a reference hash of the application program stored on the embedded system by the application management process, and verifying application programming interface permissions of the application program matches reference application programming interface permissions of the application program stored on the embedded system by the application management process.

Example 29 may be example 27, further comprising storing, by the application execution process, a record of the successful verification into an application execution database, which the application execution process has write access.

Example 30 may be example 21-29, further comprising receiving, by the application execution process, a request to check whether the application program is installed on the embedded system, from an application activator outside the embedded system, and in response, reporting whether the application program is installed or not to the application activator.

Example 31 may be example 30, further comprising receiving, by the application execution process, a request to run the application program, along with the application program, from the application activator outside the embedded system, and in response, verifying the application program, and on verification, loading the application program, and causing the application program to be executed; wherein on execution of the application program, the application execution process may further reporting whether execution of the application program was completed without error, without retaining the application program on the embedded system.

Example 32 may be a method for installing and executing an application on an embedded system, comprising: receiving, by an application manager disposed outside the embedded system on an apparatus, an application package having a first part that may include metadata of the application program, and a second part that may include the application program; splitting, by the application manager, the application package to separate the first and the second pan; and transmitting, by the application manager, a request along with the metadata to an application management process of the embedded system to request the application management process to install the application program onto the embedded system.

Example 33 may be example 32, further comprising on receiving a report from the application management process that indicates the application program is successfully installed onto the embedded system, transmitting, by the application manager, a request along with the application program to an application execution process of the embedded system to install the application program onto the embedded system.

Example 34 may be example 33, further comprising causing, by an application activator disposed outside the embedded system on the apparatus, the application program to be executed on the embedded system, including transmitting a request to an application execution process of the embedded system to check on whether the application program is installed on the embedded system.

Example 35 may be example 34, further comprising on receiving a report that indicates the application program is installed on the embedded system, transmitting, by the application activator, a request along with the application program to the application execution process of the embedded system to execute the application program on the embedded system.

Example 36 may be one or more computer-readable media comprising instructions that cause an embedded system, in response to execution of the instructions by a processor of the embedded system, to cause the embedded system to install an application program on the embedded system, wherein to cause an application program to be installed on the embedded system may include to operate: an application management process on the embedded system to verify metadata associated with the application program, in response to a first request to install the application program on the embedded system; and an application execution process on the embedded system to verify the application program, in response to a second request, subsequent to the first request, to verify the application program.

Example 37 may be example 36, wherein the application management process and the application execution process may be operated as separate processes.

Example 38 may be example 36, wherein the application management process may receive the first request to install the application program onto the embedded system, and the metadata of the application program from an application manager located outside the embedded system; and the application management process may further report whether the verification is successful or not to the application manager.

Example 39 may be example 38, wherein the metadata of the application program may include a signature of the metadata; and wherein verification of the metadata may comprise verification of the metadata matches the signature.

Example 40 may be example 38, wherein the embedded system may further comprise an application management database, which the application management process has write access, and the application execution process has only read access; wherein the application management process may further on verification, store the metadata into the application management database.

Example 41 may be example 40, wherein the metadata may include a hash and application programming interface permission(s) of the application program; wherein storage of the metadata into the application management database may include storage of the hash and the application programming interface permission(s) of the application program into the application management database.

Example 42 may be example 36, wherein the application execution process may receive the second request to install the application program onto the embedded system, and the application program from an application manager located outside the embedded system; and the application execution process may further report whether the verification is successful or not to the application manager.

Example 43 may be example 42, wherein verification of the application may comprise verification of a hash of the application program matches a reference hash of the application program stored on the embedded system by the application management process, and verification of application programming interface permissions of the application program matches reference application programming interface permissions of the application program stored on the embedded system by the application management process.

Example 44 may be example 42, wherein the embedded system may further comprise an application execution database, which the application execution process has write access; wherein the application execution process may further on verification, store a record of the successful verification into the application execution database, but not the application program.

Example 45 may be any one of examples 36-44, wherein the application execution process may further receive a request to check whether the application program is installed on the embedded system, from an application activator outside the embedded system, and in response, report whether the application program is installed or not to the application activator.

Example 46 may be example 45, wherein the application execution process may further receive a request to run the application program, along with the application program, from the application activator outside the embedded system, and in response, verify the application program, and on verification, load the application program, and cause the application program to be executed; wherein on execution of the application program, the application execution process may further report whether execution of the application program was completed without error, without retaining the application program on the embedded system.

Example 47 may be one or more computer-readable media comprising instructions that cause an apparatus, in response to execution of the instructions by a processor of the apparatus, to cause the apparatus to install an application program on an embedded system, that may include to operate an application manager outside the embedded system to: receive an application package having a first part that may include metadata of the application program, and a second part that may include the application program; split the application package to separate the first and the second part; and transmit a request along with the metadata to an application management process of the embedded system to request the application management process to install the application program onto the embedded system.

Example 48 may be example 47, wherein to operate an application manager outside the embedded system further may include to operate the application manager, to transmit, on receive a report from the application management process that indicates the application program is successfully installed onto the embedded system, a request along with the application program to an application execution process of the embedded system to install the application program onto the embedded system.

Example 49 may be example 48, wherein the apparatus is further caused to cause the application program to be executed on the embedded system, that may include to operate an application activator to transmit a request to an application execution process of the embedded system to check on whether the application program is installed on the embedded system.

Example 50 may be example 49, wherein to cause the application program to be executed on the embedded system further may include to operate the application activator to transmit, on receipt of a report that indicates the application program is installed on the embedded system, a request along with the application program to an application execution process of the embedded system to execute the application program on the embedded system.

Example 51 may be an apparatus for installing and executing an application program on an embedded system, comprising: application management process means for verifying metadata associated with the application program, in response to a first request to install the application program on the embedded system; and application execution process means for verifying, in response to a second request, subsequent to the first request, to verify the application program.

Example 52 may be example 51, wherein the application management process means and the application execution process means comprise separate process means.

Example 53 may be example 51, wherein the application management process means may comprise means for receiving the first request to install the application program onto the embedded system, and the metadata of the application program from an application manager located outside the embedded system; and means for reporting whether the verification is successful or not to the application manager.

Example 54 may be example 53, wherein the metadata of the application program may include a signature of the metadata; and wherein means for verifying the metadata may comprise means for verifying the metadata matches the signature.

Example 55 may be example 53, wherein application management process means may further comprise means for, on verification, storing the metadata into an application management database, which the application management process means has write access, and the application execution process means has only read access.

Example 56 may be example 55, wherein the metadata may include a hash and application programming interface permission(s) of the application program; wherein means for storing the metadata into the application management database may include means for storing the hash and the application programming interface permission(s) of the application program into the application management database.

Example 57 may be example 51, wherein the application execution process means may comprise means for receiving the second request to install the application program onto the embedded system, and the application program from an application manager located outside the embedded system; and means for reporting whether the verification is successful or not to the application manager.

Example 58 may be example 57, wherein the application execution process means may comprise means for verifying a hash of the application program matches a reference hash of the application program stored on the embedded system by the application management process means, and means for verifying application programming interface permissions of the application program matches reference application programming interface permissions of the application program stored on the embedded system by the application management process means.

Example 59 may be example 57, wherein the application execution process means may further comprise means for storing a record of the successful verification into an application execution database, which the application execution process has write access.

Example 52 may be any one of examples 51-59, wherein the application execution process means may further comprise means for receiving a request to check whether the application program is installed on the embedded system, from an application activator outside the embedded system, and means for, in response, reporting whether the application program is installed or not to the application activator.

Example 61 may be example 60, wherein the application execution process means may further comprise means for receiving a request to run the application program, along with the application program, from the application activator outside the embedded system, and means for, in response, verifying the application program; means for on verification, loading the application program, and causing the application program to be executed; and means for, on execution of the application program, reporting whether execution of the application program was completed without error, without retaining the application program on the embedded system.

Example 62 may be an apparatus for installing and executing an application program on an embedded system, comprising: means for receiving an application package having a first part that may include metadata of the application program, and a second part that may include the application program; means for splitting the application package to separate the first and the second part; and means for transmitting a request along with the metadata to an application management process of the embedded system to request the application management process to install the application program onto the embedded system.

Example 63 may be example 62, further comprising means for transmitting, on receipt of a report from the application management process that indicates the application program is successfully installed onto the embedded system, a request along with the application program to an application execution process of the embedded system to install the application program onto the embedded system.

Example 64 may be example 63, further comprising means for causing the application program to be executed on the embedded system, including means for transmitting a request to an application execution process of the embedded system to check on whether the application program is installed on the embedded system.

Example 65 may be example 64, wherein means for causing the application program to be executed on the embedded system further may include means for transmitting, on receipt of a report that indicates the application program is installed on the embedded system, a request along with the application program to an application execution process of the embedded system to execute the application program on the embedded system.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claim and its equivalents.

What is claimed is:

1. An embedded system for a host system, comprising:
a processor;
a storage coupled with the processor; and
an application management program and an application execution program separate and distinct from the application management program, disposed in the storage, to be operated by the processor to cooperate to install an application program onto the embedded system through a multi-phase installation process, wherein to install the application program on the embedded system:
the application management program is to verify and process a first portion of a multi-portion application package having metadata associated with the application program, but not the application program, and a signature of a second portion of the application package having the application program, in response to a receipt of the first portion of the application package, and a first request associated with installing the application program on the embedded system, from an application manager of the host system, during a first phase of the multi-phase installation process; and
the application execution program is to verify and process a second portion of the application package to install the application program, using the metadata and the signature of the second portion of the application package processed by the application management program, in response to receipt of the second portion of the application package and a second request, subsequent to the first request, from the application manager of the host system to complete installation of the application program, during a second phase of the multi-phase installation process.

2. The embedded system of claim 1, wherein the application management program and the application execution program are to be operated by the processor as separate processes.

3. The embedded system of claim 1, wherein the application management program is to further report whether the verification of the first portion of the application package is successful or not to the application manager of the host system.

4. The embedded system of claim 3, wherein the first portion of the application package, includes a signature of the first portion of the application package; and wherein verification of the first portion of the application package comprises verification that the first portion of the application package matches the signature included in the first portion of the application package.

5. The embedded system of claim 1, further comprising an application management database disposed in the storage, which the application management program has write access, and the application execution program has only read access; wherein the application management program is to further on verification of the first portion of the application package, store the metadata and the signature of the second portion of the application package into the application management database for subsequent use by the application execution program to complete installation of the application program during the second phase of the multi-phase installation process.

6. The embedded system of claim 5, wherein the metadata includes application programming interface permission(s) of the application program; wherein storage of the metadata into the application management database includes storage of the application programming interface permission(s) of the application program into the application management database.

7. The embedded system of claim 1, wherein the application execution program is to further report whether the verification of the second portion of the application package and installation of the application program are successful or not to the application manager.

8. The embedded system of claim 7, wherein verification of the second portion of the application package comprises verification that a hash of the second portion of the application package matches the signature of the second portion of the application package processed by the application management program, and verification of application programming interface permissions of the application program matches application programming interface permissions of the application program included in the metadata processed by the application management program.

9. The embedded system of claim 7, further comprising an application execution database disposed in the storage, which the application execution program has write access; wherein the application execution program is to further on verification of the second portion of the application package, store a record of the successful verification of the second portion of the application package into the application execution database.

10. The embedded system of claim 1, wherein the application execution program is to further receive a request to check whether the application program is installed on the embedded system, from an application activator of the host system, separate and distinct from the application manager of the host system, and in response, report whether the application program is installed or not to the application activator of the host system.

11. The embedded system of claim 10, wherein the application execution program is to further receive a request to run the application program, from the application activator of the host system, and in response, cause the application program to be executed; wherein on execution of the application program, the application execution program is to further report whether execution of the application program was completed without error.

12. A host apparatus for installing and executing an application program on an embedded system of the host apparatus, comprising:
a processor;
a storage coupled with the processor; and
an application manager disposed in the storage, to be operated by the processor to cause an application program to be installed on the embedded system of the host apparatus, wherein to cause the application program to be installed on the embedded system, the application manager is to:
receive an application package having a first part that includes metadata of the application program, and a second part that includes the application program, wherein the first part also includes a signature of the second part of the application package;
split the application package to separate the first part and the second part;
transmit the first part, along with a request, to an application management process disposed on the embedded system to request the application management process to verify and process the first part of the application package as part of a first phase of a multi-phase installation process for installing the application program onto the embedded system;
transmit the second part of the application package, along with a request, to an application execution process disposed on the embedded system, to verify the second part of the application package and install the application program onto the embedded system, as part of a second phase of the multi-phase installation process, on successful verification and process of the first part of the application package;
an application activator disposed in the storage, separate and distinct from the application manager, to be operated by the processor to transmit a request to the application execution process of the embedded system to execute the application program on the embedded system, on confirmation of successful installation of the application program on the embedded system.

13. The apparatus of claim 12, wherein the application manager is to further receive a report from the application management process of the embedded system, on whether the first part of the application package is successfully verified and processed or not.

14. The apparatus of claim 12, wherein the application manager is to further receive a report from the application execution process of the embedded system on whether the application program is successfully installed onto the embedded system or not.

15. The apparatus of claim 12, wherein the application activator is to transmit a request to the application execution process of the embedded system to check on whether the application program is installed on the embedded system.

16. The apparatus of claim 12, wherein the application activator is to further receive a report from the application execution process of the embedded system on whether the application program is executed onto the embedded system to completion without error.

17. A method for installing and executing an application program on an embedded system of a host system, comprising:
verifying and processing, by an application management process of the embedded system, a first portion of an application package having metadata associated with the application program, and a signature of a second portion of the application package, in response to a receipt of the first portion of the application package, and a first request to verify and process the first portion of the application package for installing the application program on the embedded system, from an application manager of the host system, as part of a first phase of a multi-phase installation process; and
verifying and processing, by an application execution process of the embedded system, separate and distinct from the application management process, the second portion of the application package, to install the application program, using the metadata of the application program and the signature of the second portion of the application package processed by the application management process, in response to receipt of the second portion of the application package and a second request, subsequent to the first request, from the application manager of the host system, to verify and process the second portion of the application package to install the application program.

18. The method of claim 17, further comprising reporting, by the application management process, whether the verification and processing of the first portion of the application package is successful or not to the application manager;
wherein the verifying and processing by the application management process comprises on verification of the first portion of the application package, storing, by the application management process, the signature of the second portion of the application package and the metadata into an application management database, which the application management process has write access, and the application execution process has only read access.

19. The method of claim 17, wherein the verifying and processing by the application execution process further comprises reporting, by the application execution process, whether the verification and processing of the second portion of the application package is successful or not to the application manager of the host system;
wherein the verifying by the application execution process comprises verifying a hash of the second portion of the application package matches the signature of the second portion of the application package processed by the application management process, and verifying application programming interface permissions of the application program match reference application programming interface permissions of the application program in the metadata processed by the application management process; and wherein the method further comprises storing, by the application execution process, a record of the successful verification into an application execution database, which the application execution process has write access.

20. The method of claim 17, further comprising:

receiving, by the application execution process, a request to check whether the application program is installed on the embedded system, from an application activator of the host system, separate and distinct from the application manager of the host system, and in response, reporting whether the application program is installed or not to the application activator of the host system; and receiving, by the application execution process, a request to run the application program, from the application activator of the host system, and in response, causing the application program to be executed; wherein on execution of the application program, the application execution process is to further report whether execution of the application program was completed without error.

21. A method for installing and executing an application program on an embedded system of a host system, comprising:

receiving, by an application manager of the host system, disposed outside the embedded system of the host system, an application package having a first part that includes metadata of the application program, and a second part that includes the application program, the first part further including a signature of the second part of the application package;

splitting, by the application manager, the application package to separate the first part and the second part;

transmitting, by the application manager, the first part of the application package, along with a request, to an application management process of the embedded system to request the application management process to verify and process the first part of the application package as part of a first phase of a multi-phase installation process for installing the application program onto the embedded system;

transmitting, by the application manager, the second part of the application package, along with a request, to an application execution process of the embedded system to verify and process the second part of the application package and to install the application program onto the embedded system as part of a second phase of the multi-phase installation process; and transmitting, by an application activator of the host system, disposed outside the embedded system of the host system, a request to the application execution process of the embedded system to execute the application program on the embedded system in response to receipt of a report that indicates the application program is installed on the embedded system.

22. The method of claim 21, further comprising:

receiving, by the application manager, a report from the application management process of the embedded system that indicates the verification and processing of the first part of the application package are successful, wherein the transmitting, by the application manager, of the second part of the application package, along with the request, to the application execution process of the embedded system to verify and process the second part of the application package and to install the application program onto the embedded system, is in response to the receipt of the report from the application management process of the embedded system that indicates the verification and processing of the first part of the application package are successful; and transmitting a request, by the application activator to the application execution process of the embedded system, to check on whether the application program is installed on the embedded system.

* * * * *

UNITED STATES PATENT AND TRADEMARK OFFICE
CERTIFICATE OF CORRECTION

PATENT NO. : 10,831,508 B2
APPLICATION NO. : 16/307126
DATED : November 10, 2020
INVENTOR(S) : Ligang Wang et al.

Page 1 of 1

It is certified that error appears in the above-identified patent and that said Letters Patent is hereby corrected as shown below:

In the Claims

Column 20
Line 31, Claim 4 "...package,..." should read "...package..."

Signed and Sealed this
Fifth Day of January, 2021

Andrei Iancu
*Director of the United States Patent and Trademark Office*